United States Patent
Willke, II

(10) Patent No.: US 6,609,168 B1
(45) Date of Patent: Aug. 19, 2003

(54) BUS MASTER READ REQUEST ADAPTIVE PREFETCH PREDICTION METHOD AND APPARATUS

(75) Inventor: Theodore L. Willke, II, Tacoma, WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/541,131

(22) Filed: Mar. 31, 2000

(51) Int. Cl.$^7$ .............................. G06F 13/00; G06K 9/00
(52) U.S. Cl. .................... 710/110; 710/33; 711/137; 712/210; 712/220; 382/100
(58) Field of Search .................... 710/33; 711/137; 712/210, 220; 382/100

(56) References Cited

U.S. PATENT DOCUMENTS 5,305,389 A * 4/1994 Palmer ........................ 382/100
6,029,228 A * 2/2000 Cai et al. ..................... 711/137
6,041,405 A * 3/2000 Green .......................... 712/210
6,148,395 A * 11/2000 Dao et al. .................... 712/220
6,223,232 B1 * 4/2001 Adusumilli et al. .......... 710/33

* cited by examiner

Primary Examiner—Sumati Lefkowitz
Assistant Examiner—Christopher E. Lee
(74) Attorney, Agent, or Firm—Blakely, Sokoloff, Taylor & Zafman LLP

(57) ABSTRACT

An apparatus and method for predicting quantities of data required by requesting devices capable of requesting unspecified quantities of data from storage device, in which prediction of quantities that will be required are made based on past patterns of quantities of data required in past transfers.

21 Claims, 4 Drawing Sheets

BUS MASTER READ REQUEST ADAPTIVE PREFETCH PREDICTION METHOD AND APPARATUS

FIELD OF THE INVENTION

The present invention is related to a method and apparatus for adaptively predicting quantities of data to be prefetched in response to bus master read requests.

ART BACKGROUND

Computer systems commonly have one or more storage devices, such as random access memory, and busses that can used to transfer data from such storage device, to other devices within the computer system in a memory read transfer. These busses are often designed to support memory read transfers of small quantities of data, and these transfers are sufficient to support commonly occurring random reads from storage locations within a storage device. In the case of many busses, such memory read transfers begin with a distinct address phase in which the address of the storage location from which data is to be retrieved is transmitted to the storage device. This is then followed by a distinct data phase in which a single transfer of data takes place. If more data is to be retrieved, then additional memory read transfers must be performed, each having both address and data phases. However, such memory read transfers are inefficient for use in retrieving a larger quantity of data from a group of adjacent storage locations within a storage device.

Various higher performance busses support a form of transfer commonly referred to as a "burst" transfer in which there is one address phase, followed by multiple data Phases. In this way, efficiency can be increased for memory transfers from a larger number of adjacent storage locations by transmitting only the address of the first storage location. The first data phase entails the transfer of data from the storage location within the storage device that was specified by the transmitted address, and the subsequent data phases entail the transfer of data from adjacent storage locations. This is commonly referred to as a "burst read transfer." In some higher performance busses, burst read transfers can be interrupted or suspended between the address phase and the first data phase, or between data phases, in order to allow the bus to be made available for other uses.

A common drawback in the implementation of various busses supporting burst read transfers, however, is that the bus does not provide a way for a device requesting a burst read transfer, such as a bus master device, to specify the exact quantity of data desired. Some bus implementations allow a bus master device to begin a burst read transfer, and then simply continue to perform data phases in that burst read transfer until the bus master device has received the desired quantity of data. This means that the exact quantity of data to be transferred cannot be known until the transfer has been completed.

The fact that the quantity of data to be transferred in a burst read transfer cannot be known until the transfer has ended impairs efforts to optimize the reading of data for such transfers from a storage device. This can be especially true in the case of burst read transfers from such storage devices as random access memory (RAM). Some forms of RAM impose considerable latencies on accesses to storage locations to read data, resulting in adverse effects on the performance of burst read transfers. Were it possible to know the exact quantity of data to be read for a burst transfer, it might be possible to use various well known techniques to counteract the effects of such latencies, and the performance of such burst transfers could be improved.

SUMMARY OF THE INVENTION

An apparatus and method for predicting quantities of data required by requesting devices capable of requesting unspecified quantities of data from storage devices, in which patterns of quantities required in past transfers are monitored. Predictions are made based on those patterns, associated with a pattern, used to make requests for data from storage devices, and selectively modified if they prove to be inaccurate.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The example embodiments of the present invention are described in the context of a buts master device retrieving data in a burst read transfer from a random access memory (RAM) storage device. However, the present invention is applicable to a variety of types of data transfers between a variety of devices. The present invention could be used with cache line fill transfers, and situations in which there are types of transfers in which a pre-defined quantity of data is to be transferred, but uncertainty exists as to which of the possible pre-defined quantities is to be transferred. The present invention could be used with bus bridge devices taking the role of a bus master device, as hereinafter described. Furthermore, storage devices other than RAM may be used with the present invention.

Figure 1:
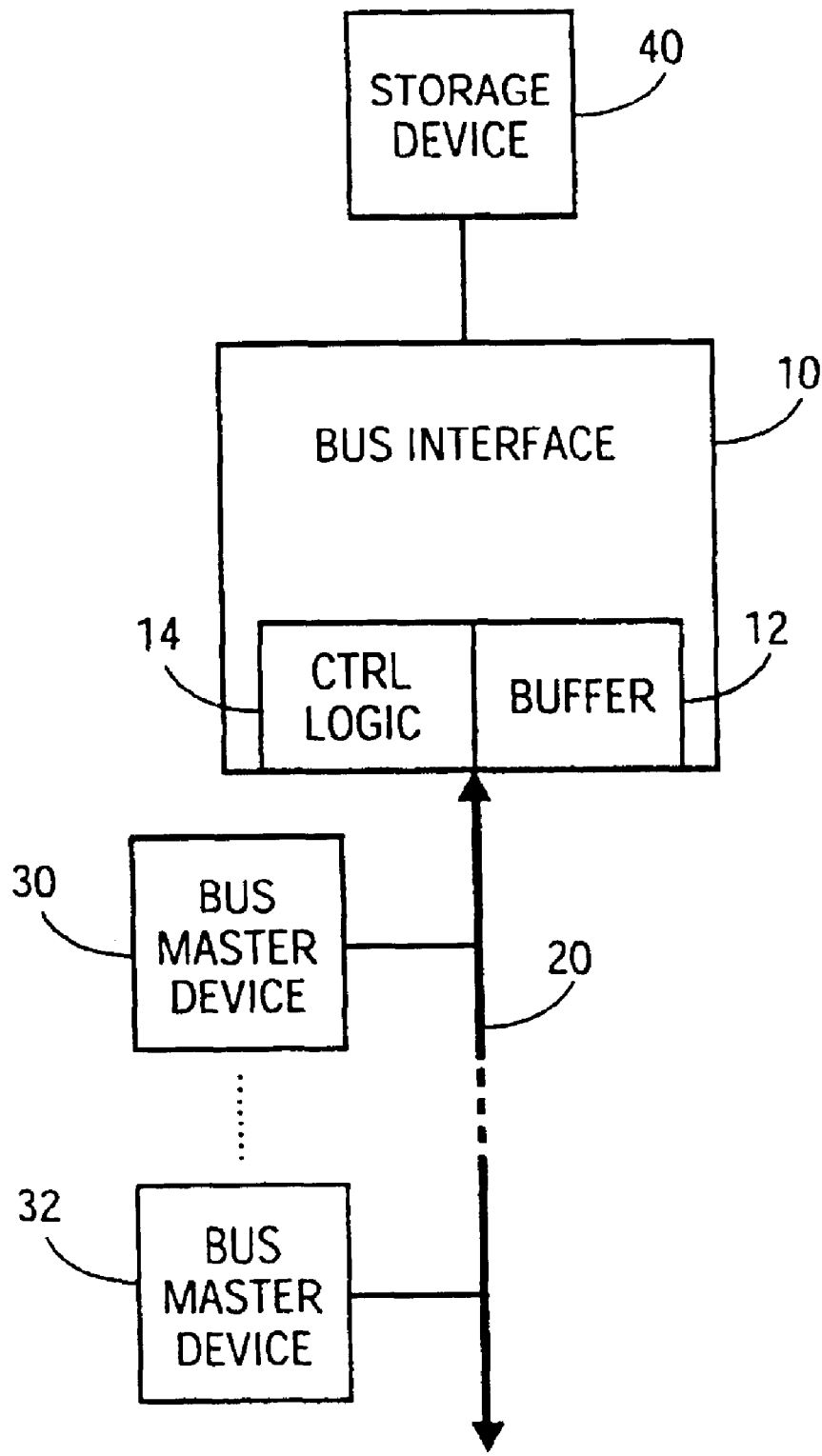
FIG. 1 is a simplified block diagram of one embodiment of a bus interface.

FIG. 1 depicts one embodiment of a bus interface. Bus interface 10 provides access to storage device 40 from bus 20, and includes buffer 12 and control logic 14. Coupled to bus 20 are bus master device 30, and optionally, one or more additional devices such as device 32. Bus master device 30 reads data from storage locations within storage device 40 via bus 20 and bus interface 10. Furthermore, bus interface 10 and bus 20 support burst read transfers, allowing bus master device 30 to read data stored in multiple adjacent storage locations within storage device 40 with a single transfer.

Bus master device 30 begins a burst read transfer on bus 20 to read from adjacent storage locations within storage device 40 by signaling bus interface 10 with a request to perform a read operation and by transmitting the address of the first storage location from which data is to be read to bus interface 10. Control logic 14 responds with a signal for bus master device 30 to temporarily suspend the requested burst read transfer while data is read from storage device 40. While this request is suspended, bus 20 may be used to carry out other function,.

The quantities of data actually transferred in the last few burst read transfers are retained by control logic 14 and used together as a pattern to select and make predictions of how much data will be transferred in a current burst read transfer. These predictions are based on the assumption that if a bus master device retrieved a given quantity of data after a given pattern of quantities retrieved in previous burst transfer, then a bus master device will likely retrieve the same given quantity, again, after the same given pattern has occurred, again. Different storage locations within buffer 12 correspond to different patterns of quantities of data for previous burst read transfers. When control logic 14 receives a request for a burst read transfer, control logic 14 uses the pattern of the quantities of data transferred in the last few transfers to select the storage location within buffer 12 that corresponds to that pattern to retrieve the prediction value to be used in the current burst read transfer. From the same storage location within buffer 12, control logic 14 also retrieves an accuracy value providing a measure of the accuracy of the prediction.

Control logic 14 uses the retrieved prediction to read a quantity of data from storage device 40, starting at the storage location within storage device 40 that was specified in the address transmitted by bus master device 30. As the data is read from storage device 40, it is stored in another part of buffer 12. Control logic 14 then signals bus master device 30 to proceed with the requested burst read transfer, and the burst read transfer then takes place with buffer 12 supplying data across bus 20 to bus master device 30. As the burst read transfer takes place, control logic 14 monitors the quantity of data actually transferred to evaluate the prediction made for the current transfer to determine if the prediction should be modified. If a prediction proves inaccurate such that too little data is initially requested from storage device 40 to supply the quantity required by bus master device 30 for a current transfer, then control logic 14 will read additional data from storage device 40 until bus master device 30 has received the quantity desired. The current transfer may be suspended one or more times between data phases to accommodate latencies incurred in reading data from storage device 40, especially if additional data must be read. At the end of the current transfer, if the prediction should be modified, control logic 14 stores the modified prediction into the same storage location in buffer 12 from which the prediction value was read for the current transfer. Control logic 14 also stores a 2-bit value indicating a measure of accuracy of prediction.

In one Embodiment, if the prediction used in the current transfer proved to be inaccurate, the prediction would be immediately modified and stored in buffer 12, as just described. In another embodiment, the 2-bit value specifying a measure of accuracy would also be used in making the prediction for the next burst read transfer following the same pattern. In this other embodiment, this accuracy value is used to insert a delay or "hysteresis" in changes made to the prediction value. This is intended to counteract the effects of infrequent or "one-time" occurrences of burst read transfers in which anomalous quantities of data are transferred. In this other embodiment, a prediction is modified only after it has proven to be inaccurate in at least two successive transfers.

Table 1, below, illustrates one set of "rules" by which prediction values may be modified, and what kind of accuracy value would be stored with a prediction.

TABLE 1

| current accuracy value retrieved from storage | accurate of prediction for current transfer | how the prediction will be modified | modified accuracy value to be stored |
| --- | --- | --- | --- |
| too low | too low | increased by 1 | just right |
| too low | just right | unmodified | too low |
| just right | too low | unmodified | too low |
| just right | just right | unmodified | just right |
| too low | too high | unmodified | just right |
| too high | too low | unmodified | just right |
| just right | too high | unmodified | too high |
| too high | just right | unmodified | too high |
| too high | too high | decreased by 1 | just right |

It will be understood by those skilled in the art that the implementation of a delay could entail storing and using more than one accuracy value. It will also be understood that the delay could be such that more than 2 occurrences of an inaccuracy would be required before a prediction would be modified.

Although, in this embodiment, the data read from storage device 40 is temporarily stored in buffer 12, along with prediction and accuracy values, it will be understood that the data read from storage device 40 for the current transfer could be stored in a separate buffer, not shown. Also, although in this embodiment, new predictions for a future burst read transfer after a given pattern are made at the end of a current burst read transfer, it will be understood that the making of future predictions can be delayed until the request for the future burst read transfer is actually received. In such an embodiment, the prediction values stored in buffer 12 would reflect the predictions made for current transfers, and would not be prediction values made for future transfers.

In one embodiment, control logic 14 would store separate sets of prediction and accuracy values for each bus master device coupled to bus 20, and would make sure separate predictions for each bus master device coupled to bus 20. Thus, if device 32 were another bus master device, control logic 14 would treat bus master device 30 and device 32, separately. However, in another embodiment, control logic 14 would store one set of predictions and results, and would make predictions for all bus master devices coupled to bus 20. In one embodiment, control logic 14 would maintain and use separate pattern for each bus master device coupled to bus 20, though a pattern could be maintained for all bus master devices coupled to bus 20.

Figure 2:
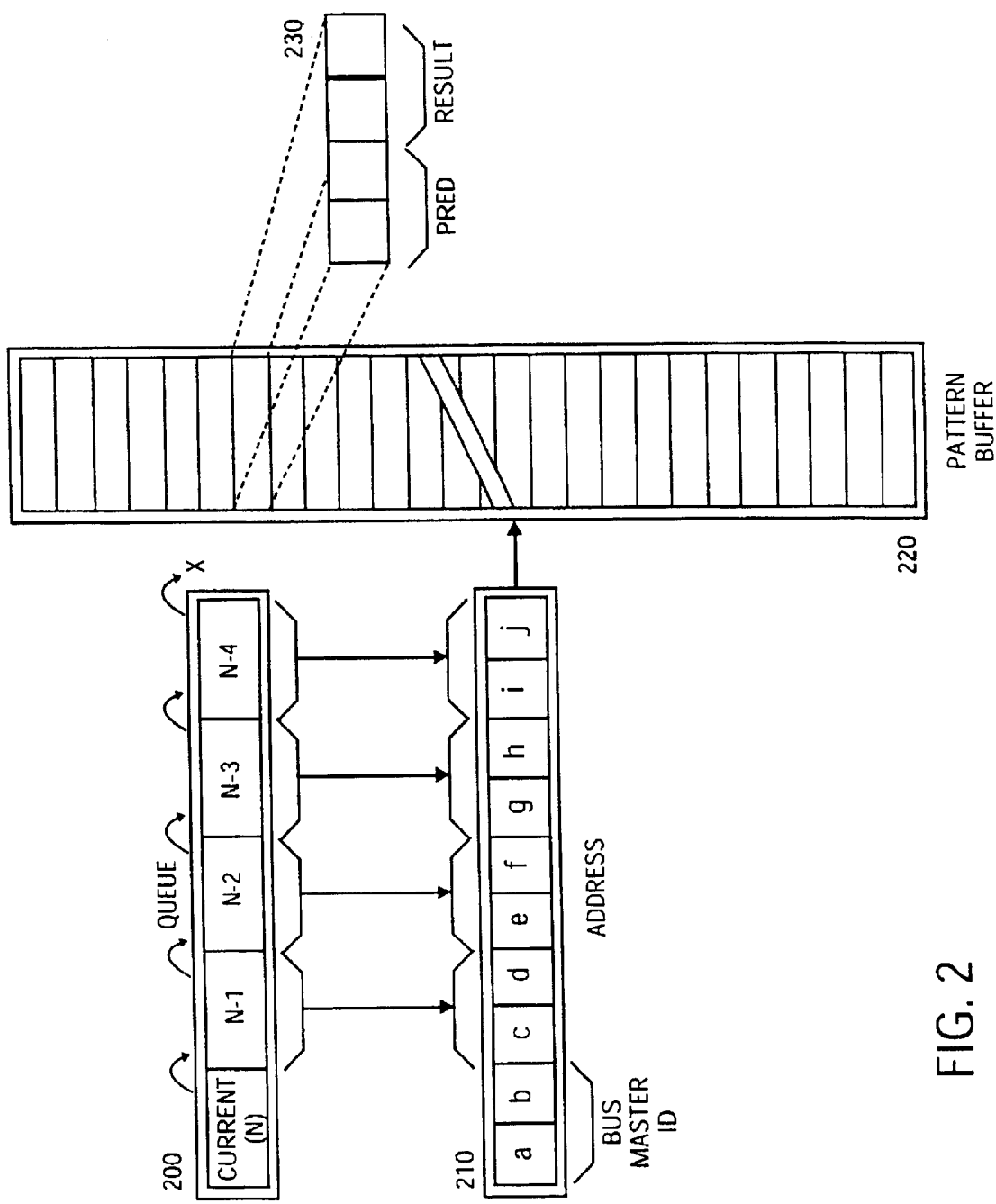
FIG. 2 is a simplified block diagram of one embodiment of a method for predicting quantities of data required in burst read transfers.

FIG. 2 depicts an embodiment of a method of predicting quantities of data required from a storage device. In this embodiment, 2-bit binary values are used to specify quantities of data actually transferred or predicted to be transferred. As will understood by those skilled in the art, varying numbers of bits corresponding to any of a number of values or ranges of values may be used. In this embodiment, binary values 0 through 3 correspond to ranges of quantities of bytes depicted in Table 2, below.

TABLE 2

| 00 | 128 bytes or less |
| 01 | 129 to 256 bytes |
| 10 | 257 to 512 bytes |
| 11 | 513 bytes or greater |

It will be understood by those skilled in the art that the number of bits used to specify quantities of data, as well as the quantities or ranges of quantities that each combination of bits specifies, can be made programmable. In this embodiment, 2-bit values are also used to specify a measure of accuracy of a prediction. Again, it will be understood by those skilled in the art that varying numbers of bits corresponding to various accuracy values may be used. In this embodiment, binary values 0 through 2 correspond to various measures of accuracy, as depicted in Table 3, below.

TABLE 3

| | |
|---|---|
| 00 | prediction too low |
| 01 | within range |
| 10 | prediction too high |
| 11 | no meaning assigned |

It will be understood that the number of bits used to provide a measure of accuracy, as well as the measures that each combination of bits specifies, can be made programmable.

Queue 200 is divided into 5 storage locations, each of which is 2 bits in size. Position N stores 2 bits indicating the actual quantity of bytes of data required by a current burst read transfer when the transfer has been completed and the quantity is then known. Positions N−1 through N−4 each store 2 bits indicating the actual quantity of data required in the last 4 burst read transfers, with position N−1 being the most recent of those transfers, and position N−4 being the least recent. Taken together, positions N−1 through N−4 describe the pattern of quantities of data transferred over the last 4 burst read transfers. Queue 200 is used in a manner analogous to a FIFO (first-in-first-out) buffer, although the physical implementation of queue 200 could take many forms, as will be readily understood by those skilled in the art. As a current burst read transfer is completed and the quantity of data transferred is then known, the 2 bits representing the quantity of bytes transferred in the current transfer are placed in position N, and the data that was in position N is shifted to position N−1, and so or through the positions of queue 200, with the data that was in position N−4 being discarded. In this way, the quantity of data transferred in the current transfer becomes part of the pattern that will be used when a request is received for a future burst read transfer.

Pattern buffer 220 is used to store predictions of quantities of data for a burst read transfer that occurs after each possible pattern, along with measures of accuracy of prediction. Pattern buffer 220 includes 1024 storage locations, each of which is 4 bits, or 1 nibble in size. Storage location 230 is representative of these storage locations, with 2-bit prediction value and a 2-bit accuracy value.

Address 210 is used in selecting storage locations within pattern buffer 220 to access predictions and accuracy values. As shown, the 2-bit values indicating the quantities of data transferred in the last 4 transfers are used to form part of address 210. In the depicted embodiment, 2 additional bits that identify 1 of up to 4 bus master devices also form part of address 210. The use of quantities of data transferred in creating addresses for selecting storage locations within pattern buffer 220 is a way of matching the pattern of quantities transferred in the last 4 burst read transfers to a prediction and an accuracy value. In this embodiment, a separate queue 200 is maintained for each bus master device. However, in another embodiment, a single set of data for predictions and accuracy values are maintained for all bus master devices on a given bus. In such an embodiment, pattern buffer 220 would also be smaller, requiring 256 storage locations to store data representing predictions and accuracy values, instead of 1024 storage locations.

Furthermore, in still other embodiments, there may be only one queue 200 used to maintain a pattern for all bus master devices on a given bus, regardless of whether or not separate sets of prediction and accuracy values are maintained. It will also be understood that the number of positions in queue 200 may be implemented so as to be programmable, allowing larger or smaller patterns to be maintained.

When a request is received from a bus master device to read data in a burst read transfer from a storage device, the 2-bit values in positions N−1 through N−4 are used, along with the 2-bit value identifying the bus master device, to create address 210. Address 210 is used to select the storage location within pattern buffer 220 that corresponds to the pattern of quantities transferred in the last 4 burst read transfers for a specific bus master device. As previously discussed, the prediction value from the selected storage location within buffer 220 is used in requesting data from a storage device. If, at the end of the current transfer, either the prediction or accuracy value is to be modified, then the modified values are written to the same storage location within pattern buffer 220 selected by address 210. After the prediction and/or accuracy values have been modified, if necessary, the bits in the positions of queue 200 are shifted such that the bits in position N are moved to position N−1, the bits in position N−1 are moved to position N−2, and so on throughout queue 200, with the bits in position N−4 being discarded. In this way, the pattern of quantities transferred now includes a quantity value at N−1 for the burst read transfer just completed.

Figure 3:
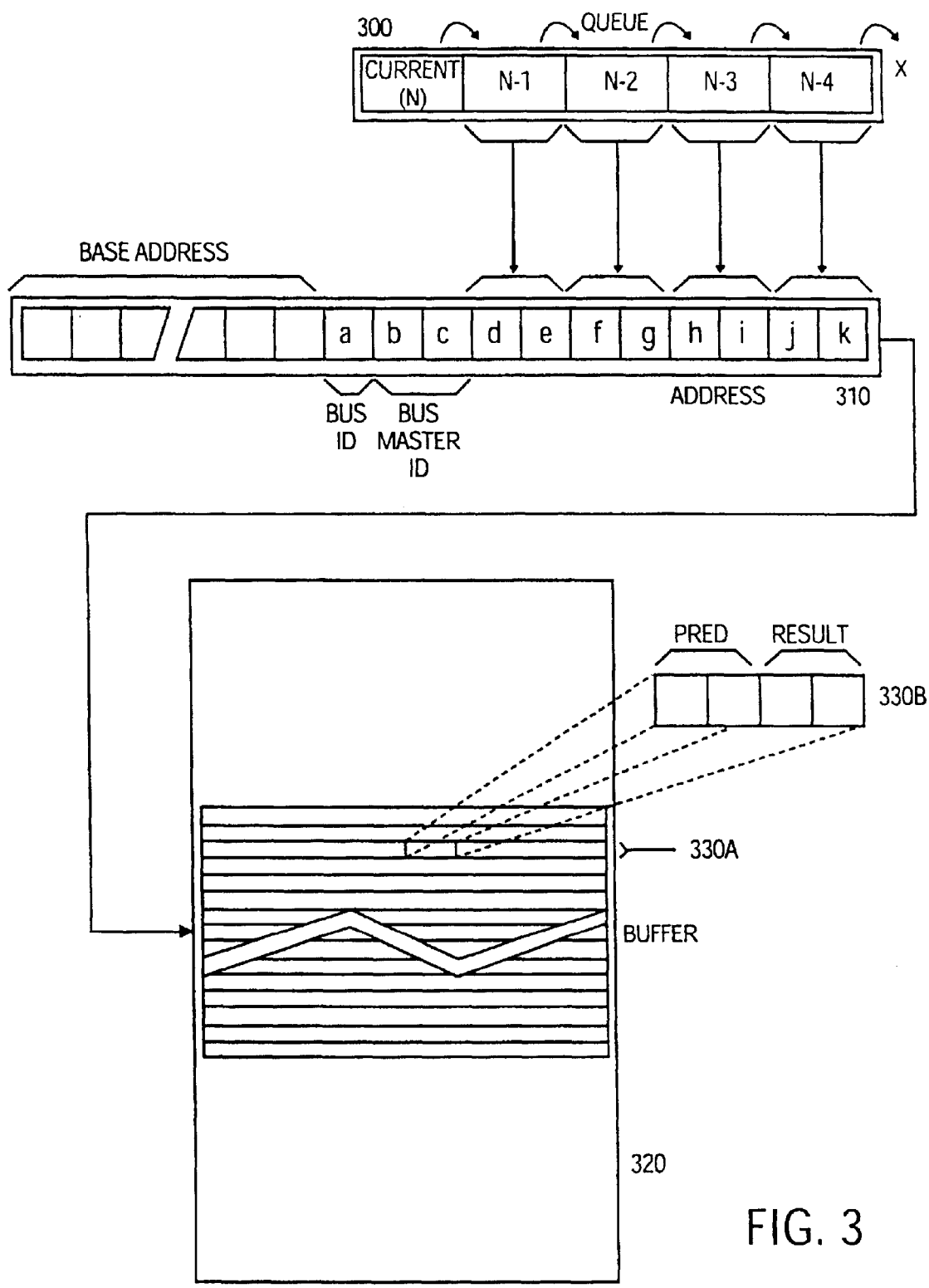
FIG. 3 is a simplified block diagram of another embodiment of a method for predicting quantities of data required in burst read transfers.

FIG. 3 depicts another embodiment of a method of predicting quantities of data required from a storage device. The numbered objects of FIG. 3 correspond, generally, to the components of FIG. 2, with numbered objects sharing the last two digits of their numbers performing similar functions. Queue 300 is similarly divided into a set of five 2-bit positions storing a pattern of quantities transferred in the last 4 burst read transfers. The storage locations, such as storage location 330a, within buffer 320 are 64 bits in width. Each storage location holds 16 nibbles, such as nibble 330b, which are used to store a 2-bit prediction value and a 2-bit accuracy value.

Buffer 320 is used to store more than the prediction and accuracy values used to practice the present invention. Other storage locations within buffer 320 are used to temporarily store data in the process of being transferred between devices. Buffer 320 may also be used to hold information needed to configure components of a computer system. The Address 310 is made up of the bits of queue 300 specifying the quantities transferred in the last 4 burst read transfers, 2 bits identifying the bus master device making the request to carry out a current burst read transfer, 1 bit identifying which 1 of 2 busses the requesting bus master device is connected to, and 1 or more bits forming a base address that specifies where within buffer 320 the prediction and accuracy values are located. Bits a through g specify the storage location to be accessed within buffer 320, while bits h through k specify the nibble to be accessed within that storage location.

Figure 4:
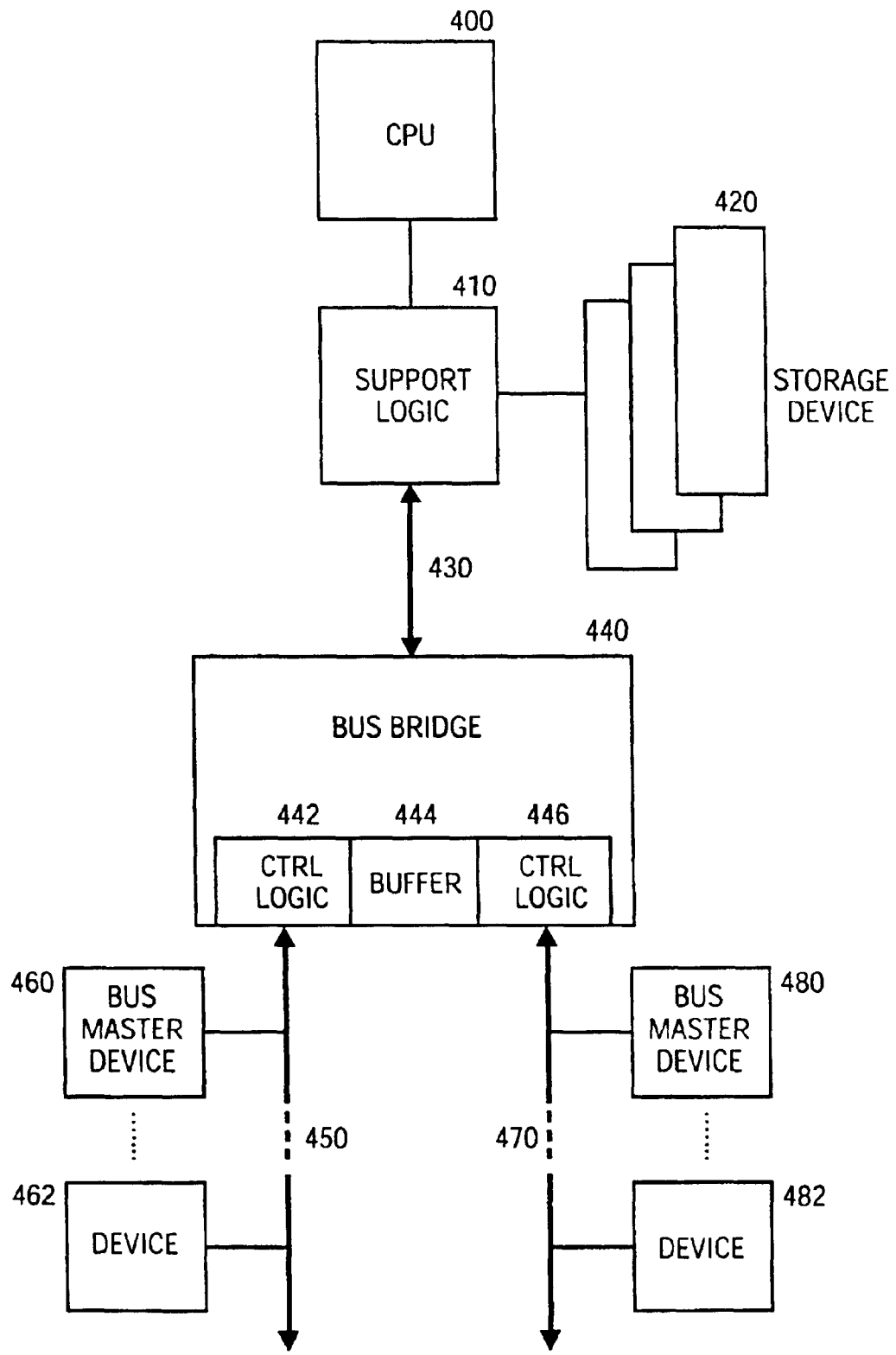
FIG. 4 is a simplified block diagram of a computer system.

FIG. 4 depicts an embodiment of a computer system. The depicted computer system includes CPU 400, coupled to support logic 410, which is also coupled to storage device 420 and bus 430. Bus 430 further couples support logic 410 with bus bridge 440. Bus bridge 440 includes control logic 442, buffer 444 and control logic 446. Coupled to bus bridge 440, and associated with control logic 442, is bus 450 which is further coupled bus master device 460 and device 462. Coupled to bus bridge 440, and associated with control logic 446, is bus 470 which is further coupled bus master device 480 and device 482. Storage device 420 is typically, but not necessarily, a random access memory or RAM used by the computer system for the storage of programs and/or data. Busses 450 and 470 are peer busses, emanating from bus bridge 440.

The manner in which prediction and accuracy values are stored in buffer 444 is as was depicted in buffer 320 of FIG. 3. The storage locations within buffer 444 are also 64 bits in width, and the storage locations within buffer 444 that are used to store prediction and accuracy values hold 16 nibbles, each of which carry a 2-bit prediction value and a 2-bit accuracy value. The manner in which these storage locations are selected employs the same addressing as was exemplified by address 310. A base address is used to differentiate the storage locations within buffer 444 that hold prediction and accuracy values from storage locations within buffer 444 that perform other functions. As in the case of address 310, the address includes of 8 bits made up of the pattern of quantities transferred in previous burst read accesses, 2 bits identifying the bus master device making the current request for a burst read transfer, and 1 bit differentiating between requests for burst transfers for bus master devices on bus 450 and from bus master devices on bus 470.

Control logic 442 receives a request from bus master device 460 to perform a burst read transfer of data from storage locations within storage device 420, starting at an address supplied by bus master device 460. Control logic 442 responds by signaling bus master device 460 to temporarily suspend the request. Control logic 442, accesses buffer 444 to obtain a prediction, and then requests the predicted quantity of data from storage device 420, starting at the address supplied by bus master device 460. The data received from storage device 420, in response to the request made by control logic 442, is stored in buffer 444 at storage locations different from those used to store prediction and accuracy values.

Control logic 442 signals bus master device 460 to proceed with the burst read transfer. The data collected from storage device 420 in buffer 444 is transmitted across bus 450 to bus master device 460. If the predicted quantity was either accurate or too large, then bus master 460 terminates the burst read transfer when the desired quantity of data has been received. If the predicted quantity was too small, then control logic 442 makes further requests for data from storage device 420, as needed, until bus master device 460 terminates the burst read transfer, thereby signaling that it has received all data needed in the current burst read transfer.

Control logic 442 is configured to implement a delay in refining predictions to counteract the effects of occasional anomalous quantities of data being required by a given bus master device. If the prediction was found to be inaccurate for the current burst read transfer, but was marked by the accuracy value such that this same prediction was not previously inaccurate, then control logic 442 will modify the accuracy value and store the modified accuracy value in buffer 444. However, if the prediction was found to be inaccurate for the current burst read transfer, and was marked by the accuracy value to indicate that it was also previously inaccurate in the same way (i.e., it was too small or too large on both occasions), then control logic 442 will modify the prediction to refine it and modify the accuracy value to mark the new prediction as accurate, and store both in buffer 444.

It will be understood by those skilled in the art that the accuracy and prediction values could be initialized to values chosen to be optimal for specific bus master devices, or to other values. Such initialization could be carried out by software such as device drivers. In one embodiment, device drivers specific to each bus master device installed in a computer system would initialize accuracy or initialization values, as desired, as each device driver is initialized. Furthermore, it will be understood that the number of quantities used to make up a pattern may also be made programmable, and may be similarly initialized by software.

It is evident that numerous alternatives, modifications, variations and uses will be apparent to those skilled in the art in light of the foregoing description.

It will be understood by those skilled in the art, that the present invention may be practiced in support of other combinations of functions in a display system in addition to or in lieu of texture mapping and/or motion compensation where the pre-fetching of pixel data is effective to differing degrees.

What is claimed is:

1. A method, comprising:
   monitoring patterns of quantities of data transferred in a plurality of earlier transfers of data from a storage device to a requesting device capable of initiating a request for data from the storage device;
   predicting, using at least one pattern, a quantity of data that will be required in a future transfer of data from the storage device to a requesting device that occurs after a future reoccurrence of a pattern of quantities of data transferred, and associating that prediction with that pattern;
   receiving a request from a requesting device for an unspecified quantity of data from the storage device;
   reading data, using a prediction, from the storage device in response to the request; and
   selectively modifying a prediction after two or more occasions in which the prediction proves to be inaccurate.

2. The method of claim 1, wherein the association of patterns and predictions is stored in a manner using patterns to select a prediction from among a plurality of predictions.

3. The method of claim 1, wherein an indicator of past occasions in which the prediction proved to be inaccurate is associated with patterns and stored in a manner using patterns to select an indicator from among a plurality of indicators.

4. The method of claim 1, wherein separate associations of patterns and predictions are maintained for each requesting device among a plurality of requesting devices.

5. The method of claim 1, wherein separate associations of patterns and predictions are maintained for each bus by which a requesting device receives the data requested.

6. An apparatus for predicting quantities of data that will be required in a transfer of data from a storage device, comprising:
   logic to monitor patterns of quantities of data transferred in at least two earlier transfers of data from the storage device to a requesting device capable of initiating a request for data from the storage device;
   logic to use at least one pattern to make a prediction of a quantity of data that will be required in a future transfer of data from the storage device to a requesting device that occurs after a future reoccurrence of a pattern of quantities of data transferred, and associating that prediction with that pattern;
   logic to use a prediction to read a quantity of data from the storage device in response to a request from a requesting device for an unspecified quantity of data from the storage device; and logic to selectively modify a prediction after two or more occasions in which the prediction proves to be inaccurate.

7. The apparatus of claim 6, wherein the association of patterns and predictions is stored in a manner using patterns to select a prediction from among a plurality of predictions.

8. The apparatus of claim 6, wherein an indicator of past occasions in which the prediction proved to be inaccurate is associated with patterns and stored in a manner using patterns to select an indicator from among a plurality of indicators.

9. The apparatus of claim 6, wherein separate associations of patterns and predictions are maintained for each requesting device among a plurality of requesting devices.

10. Art apparatus for predicting quantities of data that will be required in a transfer of data from a storage device, wherein the apparatus is incorporated into a bus interface for a first bus that supports at least one type of transfer in which the quantity of data to be transferred cannot be specified, the apparatus comprising:

logic to monitor patterns of quantities of data transferred in at least two earlier transfers of data from the storage device to a requesting device capable of initiating a request for data from the storage device;

logic to use at least one pattern to make a prediction of a quantity of data that will be required in a future transfer of data from the storage device to a requesting device that occurs after a future reoccurrence of a pattern of quantities of data transferred, and associating that prediction with that pattern;

logic to use a prediction to read a quantity of data from the storage device in response to a request from a requesting device for an unspecified quantity of data from the storage device; and logic to selectively modify a prediction if the prediction proves to be inaccurate.

11. The apparatus of claim 10, wherein separate associations of patterns and predictions are maintained for each bus by which a requesting device receives the data requested.

12. The apparatus of claim 10, wherein the bus interface is incorporated into a bus bridge device that provides an interface between the first bus and a second bus.

13. The apparatus of claim 10, wherein association of patterns and predictions is stored in a storage device that is also used to temporarily store the data requested by the requesting device.

14. A computer system, comprising:

at least one CPU;

at least one storage device;

at least one bus supporting a type of transfer of data in which the quantity of data cannot be specified when a request for data is initiated;

at least one requesting device coupled to the bus and capable of initiating a request for data from the storage device; and prediction logic to predict the quantity of data that will be required to satisfy a request for data based on patterns of quantities of data transferred from the storage device to one or more requesting devices in response to earlier requests for data from the storage device wherein a prediction is modified after two or more occasions in which the prediction proves to be inaccurate.

15. The computer system of claim 14, wherein the association of patterns and predictions is stored in a manner using patterns to select a prediction from among a plurality of predictions.

16. The computer system of claim 14, wherein an indicator of past occasions in which the prediction proved to be inaccurate is associated with patterns and stored in a manner using patterns to select an indicator from among a plurality of indicators.

17. The computer system of claim 14, wherein separate associations of patterns and predictions are maintained for each requesting device among a plurality of requesting devices.

18. A computer system, comprising:

at least one CPU;

at least one storage device;

at least one bus supporting a type of transfer of data in which the quantity of data cannot be specified when a request for data is initiated;

at least one requesting device coupled to the bus and capable of initiating a request for data from the storage device; and prediction logic incorporated into a bus interface coupled to the at least one bus to predict a quantity of data that will be required to satisfy a request for data based on patterns of quantities of data transferred in at least two earlier transfers from the storage device to the at least one requesting device in response to earlier requests for data from the storage device, and to use a prediction to read a quantity of data from the storage device to the at least one requesting device.

19. The computer system of claim 18, wherein separate associations of patterns and predictions are maintained for each bus by which a requesting device receives the data requested.

20. The computer system of claim 18, wherein the prediction logic is incorporated into a bus bridge device that provides an interface between the at least one bus and another bus.

21. The computer system of claim 18, wherein the association of patterns and predictions is stored in a storage device that is also used to temporarily store the data requested by the requesting device.

* * * * *

UNITED STATES PATENT AND TRADEMARK OFFICE
CERTIFICATE OF CORRECTION

PATENT NO. : 6,609,168 B1
DATED : August 19, 2003
INVENTOR(S) : Willke, II

It is certified that error appears in the above-identified patent and that said Letters Patent is hereby corrected as shown below:

<u>Title page,</u>
Item [57], ABSTRACT,
Line 3, delete "device", insert -- devices --.

<u>Column 1,</u>
Line 15, delete "device,", insert -- devices --.
Line 33, delete "Phases", insert -- phases --.

<u>Column 3,</u>
Line 7, delete "function,", insert -- functions --.
Line 55, delete "Embodiment", insert -- embodiment --.

<u>Column 4,</u>
Line 38, delete "prediction", insert -- predictions --.
Line 39, before "separate", delete "sure".
Line 47, delete "pattern", insert -- patterns --.
Line 51, after "specify", insert -- ranges of --.
Line 54, after "will", insert -- be --.
Line 58, before "depicted", insert -- as --.

<u>Column 5,</u>
Line 37, delete "or", insert -- on --.

Signed and Sealed this

Sixteenth Day of December, 2003

JAMES E. ROGAN
*Director of the United States Patent and Trademark Office*